United States Patent
Lin et al.

(10) Patent No.: US 9,966,849 B1
(45) Date of Patent: May 8, 2018

(54) CURRENT MODE VOLTAGE CONVERTER HAVING FAST TRANSIENT RESPONSE

(71) Applicant: ANPEC ELECTRONICS CORPORATION, Hsinchu (TW)

(72) Inventors: Hsin-Tai Lin, Taichung (TW); Chih-Yuan Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days. days.

(21) Appl. No.: 15/485,471

(22) Filed: Apr. 12, 2017

(30) Foreign Application Priority Data

Dec. 21, 2016 (TW) .............................. 105142488 A

(51) Int. Cl.
*H02M 3/158* (2006.01)
(52) U.S. Cl.
CPC .................................... *H02M 3/158* (2013.01)
(58) Field of Classification Search
CPC .................................................... H02M 3/158
USPC ......................................................... 323/271
See application file for complete search history.

(56) References Cited

U.S. PATENT DOCUMENTS

| | | | | |
|---|---|---|---|---|
| 6,288,524 B1* | 9/2001 | Tsujimoto | ............. | H02M 3/156 323/282 |
| 6,760,238 B2* | 7/2004 | Charych | ........... | H02M 3/33515 363/21.11 |
| 7,071,630 B1* | 7/2006 | York | .................. | H05B 33/0815 315/224 |
| 9,602,088 B1* | 3/2017 | Fu | .............................. | G05F 1/00 |
| 9,634,563 B2* | 4/2017 | Chen | ..................... | H02M 3/156 |
| 9,641,085 B2* | 5/2017 | Li | ..................... | H02M 3/33507 |
| 2006/0043943 A1* | 3/2006 | Huang | .................. | H02M 3/158 323/222 |
| 2013/0038301 A1* | 2/2013 | Ouyang | ................ | H02M 3/156 323/271 |
| 2014/0159686 A1* | 6/2014 | Lee | ........................ | H02M 3/156 323/282 |
| 2017/0201174 A1* | 7/2017 | Li | .......................... | H02M 3/157 |
| 2017/0207723 A1* | 7/2017 | Zhang | .................. | H02M 7/537 |

OTHER PUBLICATIONS

Received STIC search report from EIC 2800 searcher Samir Patel on Sep. 28, 2017.*

* cited by examiner

*Primary Examiner* — Timothy J Dole
*Assistant Examiner* — Htet Z Kyaw
(74) *Attorney, Agent, or Firm* — Li & Cai Intellectual Property (USA) Office

(57) ABSTRACT

A current mode voltage converter having fast transient response is provided. The current mode voltage converter is used for converting an input voltage into an output voltage to drive a load. The current mode voltage converter adaptively adjusts the frequency of a clock signal by a first compensation circuit and a second compensation circuit to accordingly adjust an inductive current. Therefore, the output voltage can be adjusted rapidly in response to different load changes to enhance the transient response of the output voltage.

14 Claims, 8 Drawing Sheets

CURRENT MODE VOLTAGE CONVERTER HAVING FAST TRANSIENT RESPONSE

BACKGROUND

1. Technical Field

The present disclosure relates to a current mode voltage converter, in particular, to a current mode voltage converter having fast transient response.

2. Description of Related Art

For power management in a system, current voltage converters are often used to provide different levels of operating voltage. An ideal current mode voltage converter is capable of providing a stable output voltage and a wide range output current. When the load changes instantaneously, the output voltage can still be stabilized at the original voltage level and quickly provides the corresponding load current, thereby efficiently converting the voltage.

Reference is made to FIG. 1 which shows the diagram of a traditional current mode voltage converter. The current mode voltage converter 10 is used for converting the input voltage VIN into the output voltage VOUT to drive a load (representing in the capacitor Cp). The current mode voltage converter 10 includes a switch circuit 12, a feedback circuit 14, a pulse width modulation (PWM) controller 16, and a driving circuit 18. The switch circuit 12 includes a high-side switch Sup and a low-side switch Sdn. The high-side switch Sup which is turned on provides a charge path to an inductor L. The low-side switch Sdn which is turned on provides a discharge path to the inductor L. The feedback circuit 14 is used for detecting the variation of the output voltage VOUT. More specifically, the feedback circuit 14 divides the output voltage VOUT by two series resistors A1 and A2 to generate the corresponding feedback voltage VFB to a decision circuit 16A of the PWM controller 16. The decision circuit 16A generates a reset signal RST to the driving circuit 18 according to the feedback voltage VFB. An oscillator 16B of the PWM controller 16 periodically generates a clock signal CLK to the driving circuit 18. The driving circuit 18 controls the high-side switch Sup and the low-side switch Sdn according to the clock signal CLK and the reset signal RST to charge or discharge the inductor L. Therefore, the driving circuit 18 generates the necessary load current and the stable output voltage VOUT.

However, in the architecture of the traditional current mode voltage converter 10, the clock signal CLK is a periodic oscillation signal. Therefore, when the load is instantaneously converted from light load to heavy load (e.g., the load current is converted from 0.5 A to 1 A), the driving circuit 18 charges the inductor L after the oscillator 16B generates the next clock signal CLK, causing an excessive decrease in the output voltage VOUT to reduce the transient response of the output voltage VOUT. Reference is made to FIG. 2 which shows the diagram of the load of the current mode voltage converter being converted from light load to heavy load. As shown in FIG. 2, at time point T1, the load is converted from the light load to the heavy load. At this time, the feedback circuit 14 detects the variation of the output voltage VOUT, and the driving circuit 18 increases the current flowing through the inductor L after the oscillator 16B generates the next clock signal CLK (i.e., after time point T2, because the frequency of the clock signal CLK is fixed), resulting in an excessive decrease in the output voltage VOUT. After that, the driving circuit 18 gradually stabilizes the output voltage VOUT to a voltage level in the subsequent clock signals (e.g., the clock signals of the time points T3 and T4).

Similarly, when the load is instantaneously converted from heavy load to light load (e.g., the load current is converted from 1 A to 0.5 A), the driving circuit 18 charges the inductor L in the subsequent clock signal CLK, causing the output voltage VOUT to continuously increase to reduce the transient response of the output voltage VOUT. Reference is made to FIG. 3 which shows the diagram of the load of the current mode voltage converter being converted from heavy load to light load. As shown in FIG. 3, at time point T5, the load is converted from the heavy load to the light load. At this time, the feedback circuit 14 detects the variation of the output voltage VOUT, and the clock signal CLK of the traditional current mode voltage converter 10 is a constant frequency. It increases the current flowing through the inductor L because of the clock signal CLK (e.g., the clock signals of the time points T6 and T7), resulting in the output voltage VOUT to continuously increase. After that, the driving circuit 18 gradually stabilizes the output voltage VOUT to a voltage level in the subsequent clock signals (e.g., the clock signals of the time points T8 and T9).

As mentioned above, no matter how the load is instantaneously converted from light load to heavy load or is converted from heavy load to light load, the output voltage VOUT of the traditional current mode voltage converter 10 has the worse transient response.

SUMMARY

Accordingly, exemplary embodiments of the present disclosure provide a current mode voltage converter having fast transient response. When the load is instantaneously converted from light load to heavy load or is converted from heavy load to light load, the current mode voltage converter can adaptively adjust the frequency of the clock signal, thereby enhancing the transient response of the output voltage for the different load changes in the continuous time.

An exemplary embodiment of the present disclosure provides a current mode voltage converter having fast transient response. The current mode voltage converter includes an output-stage circuit, a first compensation circuit, a second compensation circuit, and a clock generator. The output-stage circuit is configured for outputting an output voltage according to an inductive current. The output-stage circuit is configured for generating a feedback voltage according to the output voltage. The first compensation circuit is coupled to the output-stage circuit. The first compensation circuit is configured for generating an error amplifying signal according to the feedback voltage and a reference voltage, and compares the error amplifying signal with a ramp signal indicating the inductive current to generate a reset signal to the output-stage circuit. The second compensation circuit is coupled to the first compensation circuit. The second compensation circuit is configured for receiving the error amplifying signal and generates an AC signal and a DC signal according to the error amplifying signal. The AC signal is related to an AC value of the error amplifying signal, and the DC signal is related to a DC value of the error amplifying signal. The clock generator is coupled between the second compensation circuit and the output-stage circuit. The clock generator generates a clock signal to the output-stage circuit according to the AC signal and the DC signal. When the AC signal is greater than the DC signal, the clock generator increases the frequency of the clock signal, and the output-stage circuit adjusts the inductive current according to the clock signal and the reset signal. When the AC signal is less than or equal to the DC signal, the clock generator decreases the frequency of the clock signal, and the output-stage circuit adjusts the inductive current according to the clock signal and the reset signal.

To sum up, the present disclosure provides a current mode voltage converter having fast transient response which adaptively adjusts the frequency of a clock signal by using the first compensation circuit and the second compensation circuit to accordingly adjust the inductive current, thereby enhancing the transient response of the output voltage.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
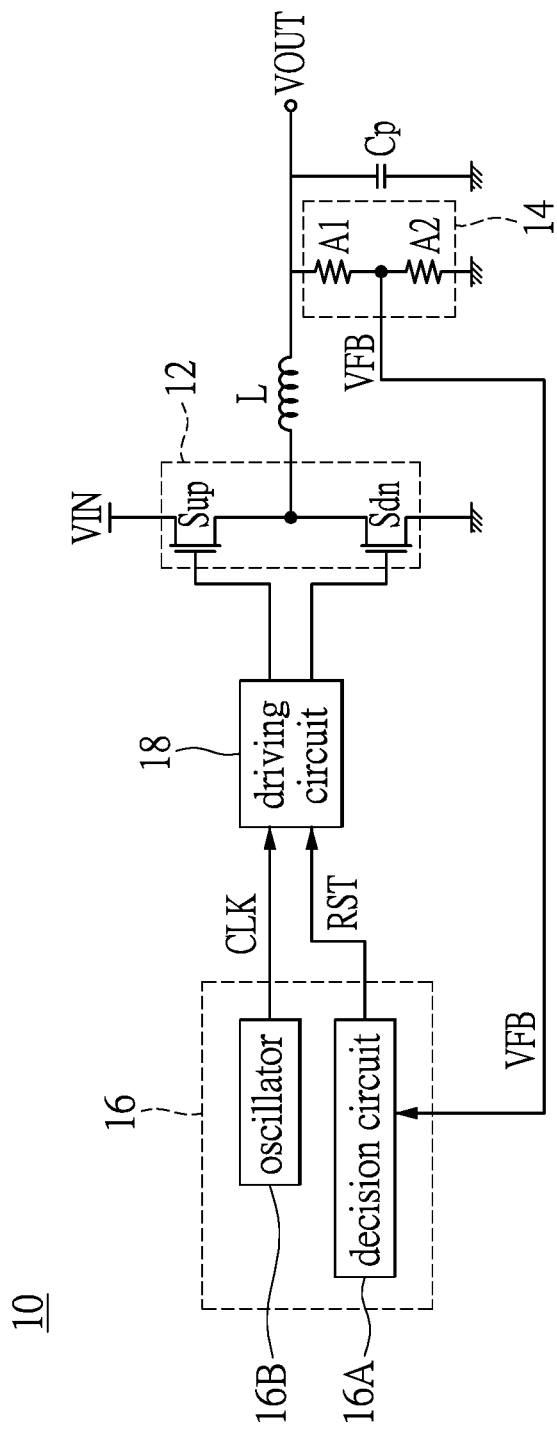
FIG. 1 shows the diagram of a traditional current mode voltage converter.
Figure 2:
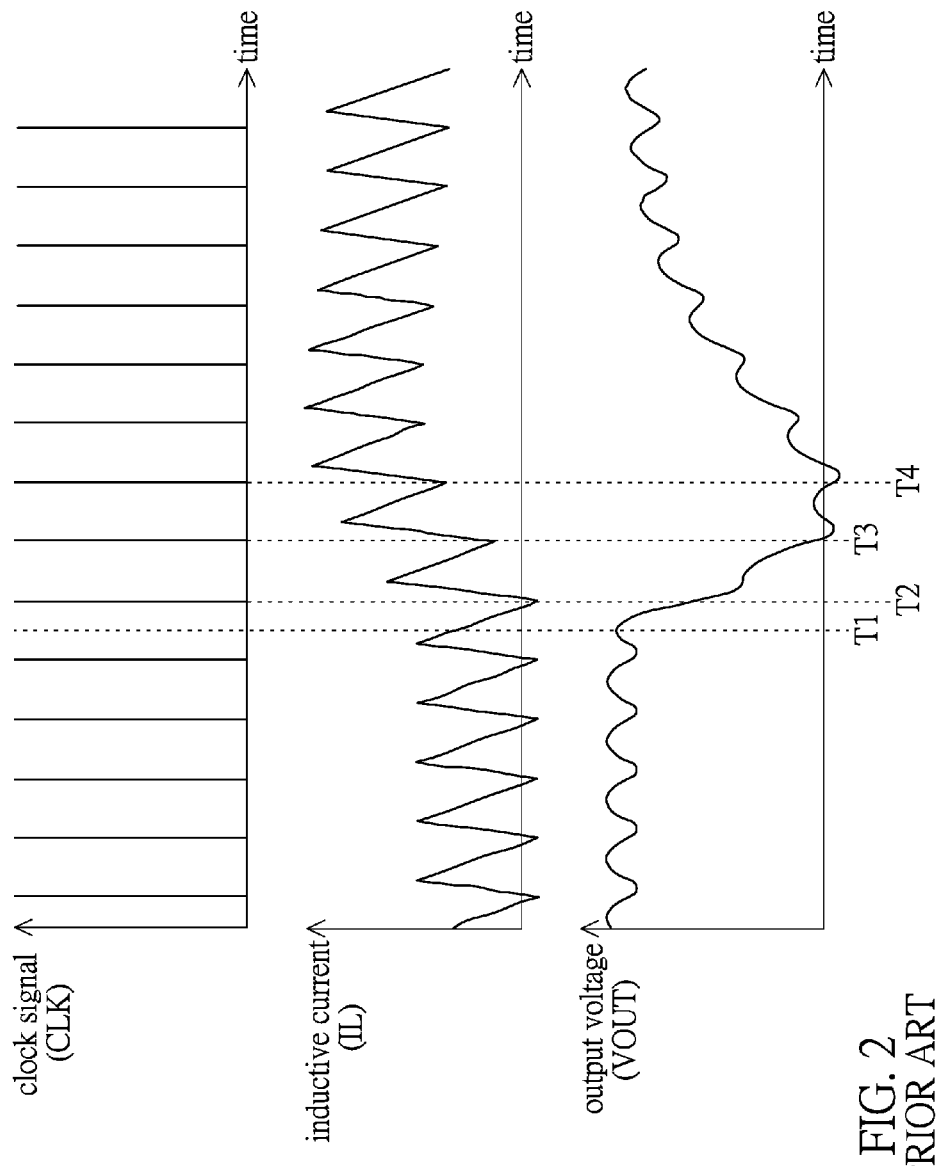
FIG. 2 shows the diagram of the load of the traditional current mode voltage converter being converted from light load to heavy load.
Figure 3:
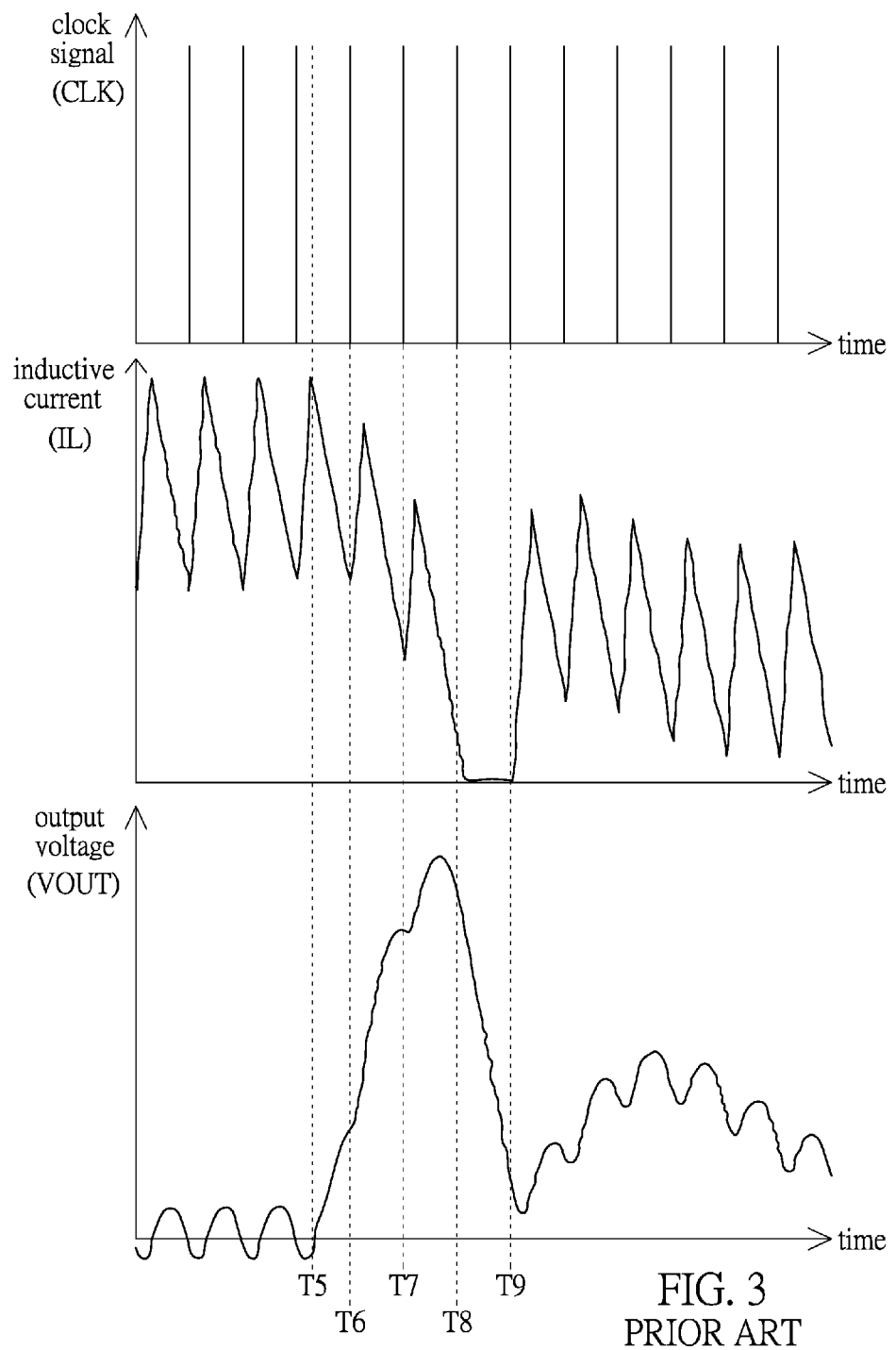
FIG. 3 shows the diagram of the load of the traditional current mode voltage converter being converted from heavy load to light load.

Reference will now be made in detail to the exemplary embodiments of the present disclosure, examples of which are illustrated in the accompanying drawings. Wherever possible, the same reference numbers are used in the drawings and the description to refer to the same or like parts.

Figure 4:
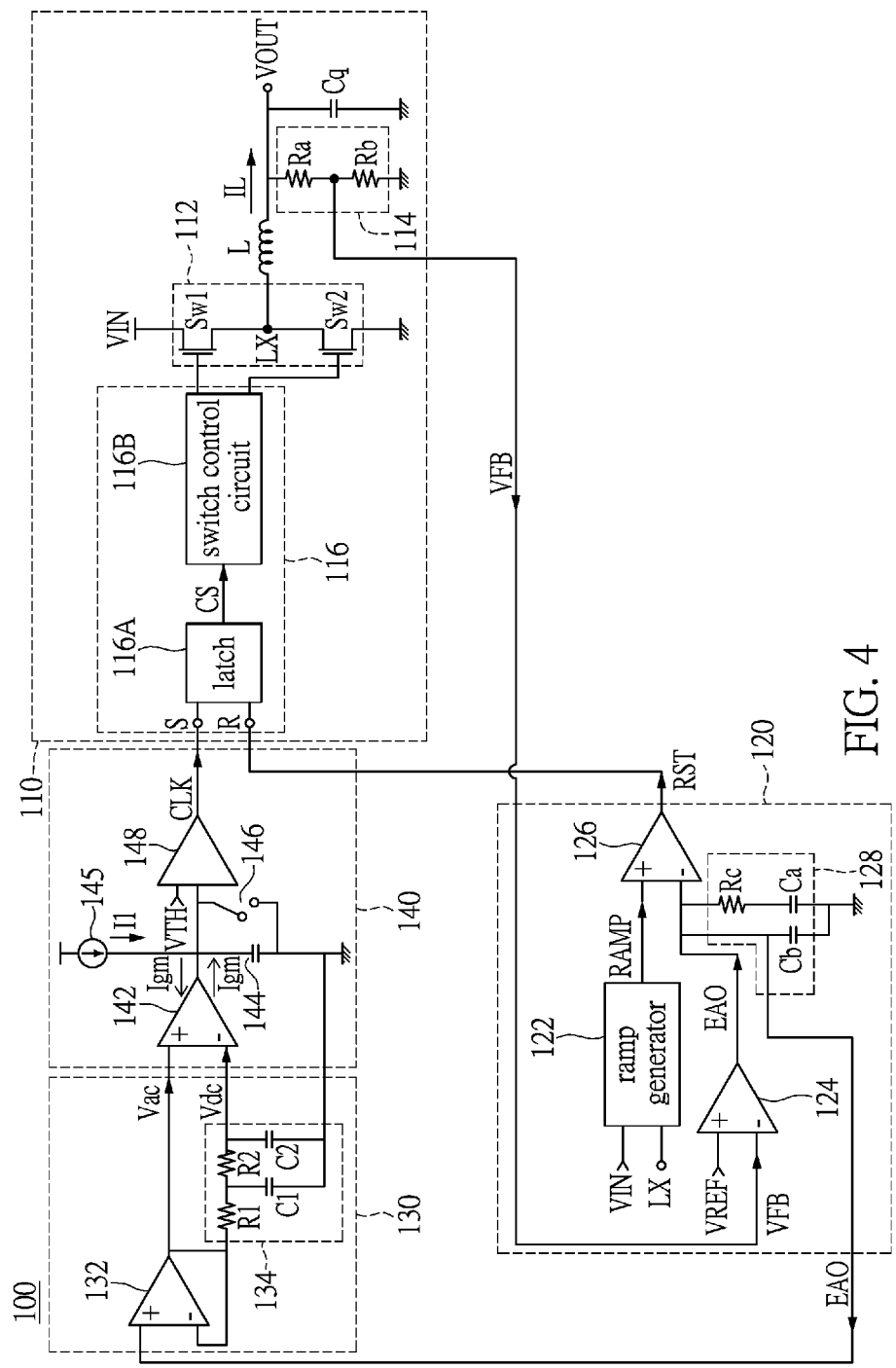
FIG. 4 shows the diagram of a current mode voltage converter according to an embodiment of the present disclosure.

Please refer to FIG. 4 which shows the diagram of a current mode voltage converter according to an embodiment of the present disclosure. As shown in FIG. 4, a current mode voltage converter 100 having fast transient response is used for converting an input voltage VIN into an output voltage VOUT to drive a load (representing in the capacitor Cq). The current mode voltage converter 100 includes an output-stage circuit 110, a first compensation circuit 120, a second compensation circuit 130, and a clock generator 140. The output-stage circuit 110 outputs the output voltage VOUT according to an inductive current IL to convert the input voltage VIN into the output voltage VOUT. The output-stage circuit 110 generates a feedback voltage VFB related to the output voltage VOUT according to the output voltage VOUT to enable the first compensation circuit 120 to execute subsequent processes.

More specifically, the output-stage circuit 110 includes a switch circuit 112, an inductor L, a feedback circuit 114, and a driver 116. The switch circuit 112 has a high-side switch SW1 and a low-side switch SW2. An end of the high-side switch SW1 receives the input voltage VIN and the other end of the high-side switch SW1 connects to a ground by the low-side switch SW2. A connection end LX is provided between the high-side switch SW1 and the low-side switch SW2. The inductor L is coupled to the connection end LX and generates the output voltage VOUT according to the inductive current IL. The feedback circuit 114 is coupled to the inductor L and generates the feedback voltage VFB according to the output voltage VOUT. In the present embodiment, the feedback circuit 14 divides the output voltage VOUT by two series resistors Ra and Rb to generate the corresponding feedback voltage VFB to the first compensation circuit 120.

The driver 116 is coupled among the clock generator 140, the first compensation circuit 120, and the switch circuit 112. The driver 116 periodically controls the turn-on and turn-off of the high-side switch SW1 and the turn-on and turn-off of the low-side switch SW2 according to a clock signal CLK and a reset signal RST to adjust the inductive current IL flowing through the high-side switch SW1 and the low-side switch SW2. The generation of the clock signal CLK and the reset signal RST will be described in the following embodiments and unnecessary descriptions are therefore omitted. More specifically, the driver 116 includes a latch 116A and a switch control circuit 116B. The latch 116A is coupled to the clock generator 140 and the first compensation circuit 120. The latch 116A has a set end S and a reset end R. The set end S receives the clock signal CLK and the reset end R receives the reset signal RST. The latch 116A generates a control signal CS to the switch control circuit 116B according to the clock signal CLK and the reset signal RST.

The switch control circuit 116B is coupled between the latch 116A and the switch circuit 112, and controls the turn-on and turn-off of the high-side switch SW1 and the turn-on and turn-off of the low-side switch SW2 according to the control signal CS. In the present embodiment, the latch 116A is SR latch. Therefore, when the clock signal CLK is converted from the low level to the high level, the latch 116A generates the control signal CS indicating the turn-on of the high-side switch SW1 and the turn-off of the low-side switch SW2. When the clock signal CLK is converted from the high level to the low level, the latch 116A generates the control signal CS indicating the turn-off of the high-side switch SW1 and the turn-on of the low-side switch SW2. Persons of ordinary skill in the art may know embodiments of the switch control circuit 116B turning on the high-side switch SW1 and turning off the low-side switch SW2 to increase the inductive current IL flowing through the inductor L and the switch control circuit 116B turning off the high-side switch SW1 and turning on the low-side switch SW2 to decrease the inductive current IL flowing through the inductor L, so detailed descriptions are omitted.

Referring to FIG. 4, the first compensation circuit 120 is coupled to the output-stage circuit 110. The first compensation circuit 120 generates an error amplifying signal EAO according to the feedback voltage VFB and a reference voltage VREF. Then the first compensation circuit 120 compares the error amplifying signal EAO with a ramp signal RAMP indicating the inductive current IL to generate the reset signal RST to the output-stage circuit 110, thereby controlling the timing of turning off the high-side switch SW1 and the timing of turning on the low-side switch SW2.

More specifically, the first compensation circuit 120 includes a ramp generator 122, an error amplifier 124, and a comparator 126. The ramp generator 122 is used for detecting the inductive current IL to generate the ramp signal RAMP indicating the inductive current IL. In the present embodiment, the ramp generator 122 receives the input voltage VIN and the voltage of the connection end LX to generate the ramp signal RAMP. The ramp generator 122 can also receive the voltage of other points flowing through the inductive current IL to detect the inductive current IL, and the present disclosure is not limited thereto.

The negative end of the error amplifier 124 receives the feedback voltage VFB, and the positive end of the error amplifier 124 receives the reference voltage VREF. The error amplifier 124 generates the error amplifying signal EAO according to the feedback voltage VFB and the reference voltage VREF. The comparator 126 is coupled to the ramp generator 122, the error amplifier 124, and the output-stage circuit 110. The positive end of the comparator 126 receives the ramp signal RAMP, and the negative end of the comparator 126 receives the error amplifying signal EAO. The comparator 126 compares the ramp signal RAMP with the error amplifying signal EAO. When the ramp signal RAMP is greater than the error amplifying signal EAO, the comparator 126 generates the reset signal RST with the high level to the output-stage circuit 110. When the ramp signal RAMP is less than or equal to the error amplifying signal EAO, the comparator 126 generates the reset signal RST with the low level to the output-stage circuit 110. When an SR latch is taken as an example of the latch 116A in this embodiment, the comparator 126 generates the error amplifying signal EAO to the reset end R of the latch 116A of the output-stage circuit 110.

In other embodiments, the first compensation circuit 120 further includes a compensating element 128. The compensating element 128 is coupled to the error amplifier 124 and the comparator 126. More specifically, the compensating element 128 has the resistor Rc and two capacitors Ca and Cb. One end of the resistor Rc is connected to the error amplifier 124 and the comparator 126, and the other end of the resistor Rc is connected the capacitor Ca in series to a ground. One end of the capacitor Ca is connected to the error amplifier 124 and the comparator 126, and the other end of the capacitor Ca is connected to a ground. Accordingly, the compensating element 128 can adjust the bandwidth of the system loop to stabilize the loop operation.

The second compensation circuit 130 is coupled to the first compensation circuit 120. The second compensation circuit 130 receives the error amplifying signal EAO. The second compensation circuit 130 generates an AC signal Vac and a DC signal Vdc according to the error amplifying signal EAO. The AC signal Vac is related to an AC value of the error amplifying signal EAO. The DC signal Vdc is related to a DC value of the error amplifying signal EAO. More specifically, the second compensation circuit 130 includes a unit gain 132 and an RC filter 134. The unit gain 132 has a positive end, a negative end, and an output end. The positive end of the unit gain 132 receives the error amplifying signal EAO. The output end of the unit gain 132 is coupled to the negative end of the unit gain 132. The unit gain 132 generates the AC signal Vac according to the error amplifying signal EAO. The RC filter 134 is coupled to the output end of the unit gain 132 and generates the DC signal Vdc according to the AC signal Vac. In the present embodiment, the RC filter 134 includes a first resistor R1, a second resistor R2, a first comparator C1, and a second comparator C2. The first resistor R1 connects to the negative end and the output end of the unit gain 132. The second resistor R2 is connected in series between the first resistor R1 and the clock generator 140. The first comparator C1 is electrically connected to an end between the first resistor R1 and the second resistor R2. The second comparator C2 is electrically connected to an end between the second resistor R2 and the clock generator 140. Therefore, the RC filter 134 filters the AC value of the error amplifying signal EAO to generate the DC signal Vdc indicating the DC value of the error amplifying signal EAO. The RC filter can be composed of resistors and capacitors, and the present disclosure is not limited thereto.

The clock generator 140 is coupled between the second compensation circuit 130 and the output-stage circuit 110. The clock generator 140 receives the AC signal Vac and the DC signal Vdc. The clock generator 140 generates a clock signal CLK to the output-stage circuit 110 according to the AC signal Vac and the DC signal Vdc, thereby controlling the timing of turning on the high-side switch SW1. When the AC signal Vac is greater than the DC signal Vdc, it indicates that the inductive current IL needs to be increased immediately. At this time, the clock generator 140 increases the frequency of the clock signal CLK, and the output-stage circuit 110 adjusts the inductive current IL according to the present clock signal CLK and the present reset signal RST. Conversely, when the AC signal Vac is less than or equal to the DC signal Vdc, it indicates that the inductive current IL needs to be decreased immediately. At this time, the clock generator 140 decreases the frequency of the clock signal CLK, and the output-stage circuit 110 also adjusts the inductive current IL according to the present clock signal CLK and the present reset signal RST.

In the present embodiment, the clock generator 140 includes a transconductance amplifier 142, a clock capacitor 144, a clock switch 146, and a clock comparator 148. The transconductance amplifier 142 has a first end, a second end, and a transconductance output end. The first end of the transconductance amplifier 142 receives the AC signal Vac. The second end of the transconductance amplifier 142 receives the DC signal Vdc. The transconductance amplifier 142 generates a transconductance current Igm according to the AC signal Vac and the DC signal Vdc. An end of the clock capacitor 144 is coupled to the transconductance output end and a current source 145, and the other end of the clock capacitor 144 is connected to a ground.

An end of the clock switch 146 is coupled to the transconductance output end, and the other end of the clock switch 146 is connected to a ground. The clock switch 146 is periodically turned-on and turned off. In the present embodiment, the clock switch 146 can be controlled by an external signal or an internal signal of the current mode voltage converter 100, and the present disclosure is not limited thereto. The clock comparator 148 is coupled to the transconductance output end and receives the transconductance current Igm. The clock comparator 148 compares the transconductance current Igm with a threshold voltage VTH to periodically generate the clock signal CLK.

Therefore, when the AC signal Vac is greater than the DC signal Vdc (indicating the inductive current IL needs to be increased immediately), the clock capacitor 144 receives a sum of the current I1 generated from the current source 145 and the transconductance current Igm (i.e., the current I1+ the transconductance current Igm) to increase the charging speed of the clock capacitor 144, thereby increasing the frequency of the transconductance current Igm. At this time, the clock comparator 148 is easier to generate the clock signal CLK, so that the frequency of the clock signal CLK is increased. Conversely, when the AC signal Vac is less than or equal to the DC signal Vdc (indicating the inductive current IL needs to be decreased immediately), the clock capacitor 144 receives the difference of the current I1 generated from the current source 145 and the transconductance current Igm (i.e., the current I1− the transconductance current Igm) to decrease the charging speed of the clock capacitor 144, thereby decreasing the frequency of the transconductance current Igm. At this time, the clock comparator 148 is not easy to generate the clock signal CLK, so that the frequency of the clock signal CLK is decreased.

According to the aforementioned, the first compensation circuit 120 provides the reset signal RST to the output-stage circuit 110. The second compensation circuit 130 controls the clock generator 140 to generate the clock signals CLK with different frequencies to the output-stage circuit 110 according to the error amplifying signal EAO generated from the first compensation circuit 120. Therefore, when the output voltage VOUT decreases, the clock generator 140 increases the frequency of the clock signal CLK to increase the inductive current IL, so as to avoid an excessive decrease in the output voltage VOUT and to enhance the transient response of the output voltage VOUT. When the output voltage VOUT increases, the clock generator 140 decreases the frequency of the clock signal CLK to decrease the inductive current IL, so as to avoid an excessive increase in the output voltage VOUT and to enhance the transient response of the output voltage VOUT.

Figure 5A:
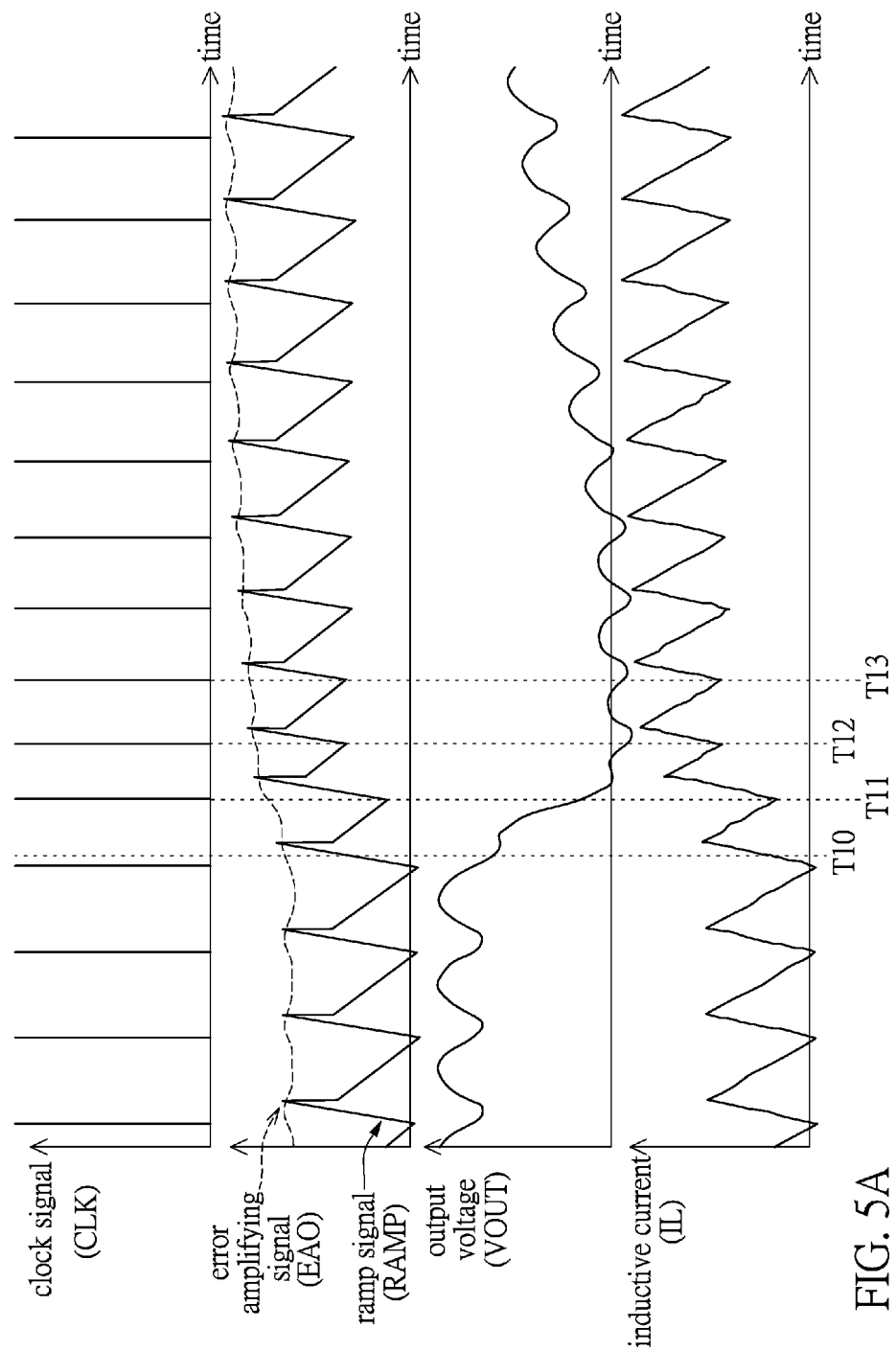
FIG. 5A shows the waveform of the load of the current mode voltage converter according to an embodiment of the present disclosure being converted from light load to heavy load.

The following description is based on the example that the load is converted from light load to heavy load. Reference is made to FIG. 5A which shows the waveform of the load of the current mode voltage converter according to an embodiment of the present disclosure being converted from light load to heavy load. As shown in FIG. 5A, at time point T10, the load is converted from the light load to the heavy load immediately. At this time, the output voltage VOUT decreases, resulting in an increase in the error amplifying signal EAO. In addition, the AC signal Vac is greater than the DC signal Vdc. Therefore, at time point T11, the clock generator 140 increases the frequency of the clock signal CLK to shorten the subsequent time of the clock generator 140 generating the clock signal CLK (e.g., time points T12 and T13), thereby stabilizing the output voltage VOUT to a voltage level gradually.

Figure 5B:
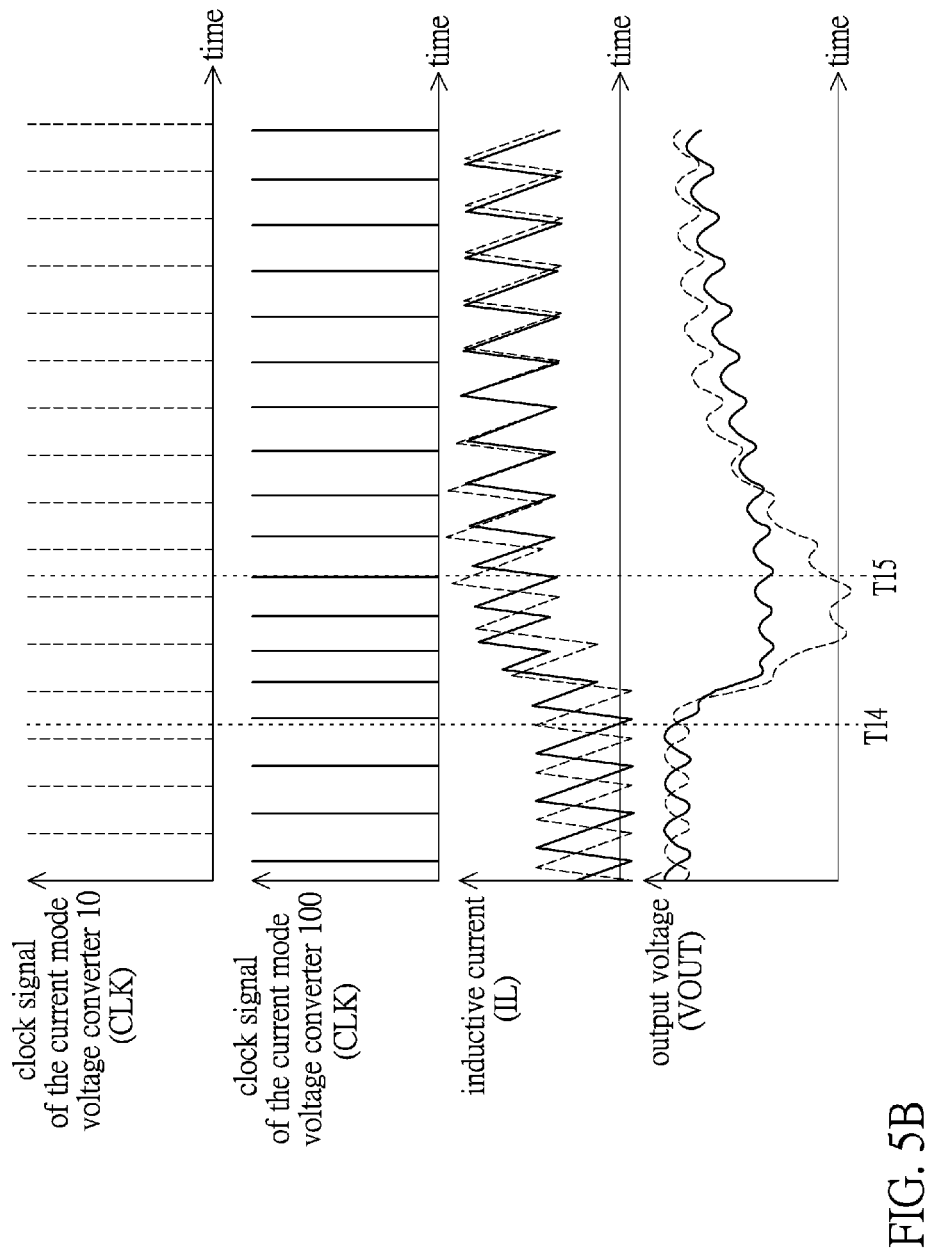
FIG. 5B shows the diagram of comparing the traditional current mode voltage converter with the current mode voltage converter according to FIG. 5A.

The comparison of the traditional current mode voltage converter 10 (the dotted line) and the current mode voltage converter 100 of the present disclosure (the active line) will be described in the following paragraph. As shown in FIG. 5B, at time point T14, the load is converted from the light load to the heavy load immediately. Because the clock signal CLK of the traditional current mode voltage converter 10 is a constant frequency, it would result in the worse transient response of the traditional output voltage VOUT. Therefore, the traditional output voltage VOUT has a larger decrease than the output voltage VOUT of the present disclosure (i.e., the time points T14 and T15). Accordingly, in the current mode voltage converter 100 of the present disclosure, when the load is converted from the light load to the heavy load, the transient response of the output voltage VOUT is enhanced.

Figure 6A:
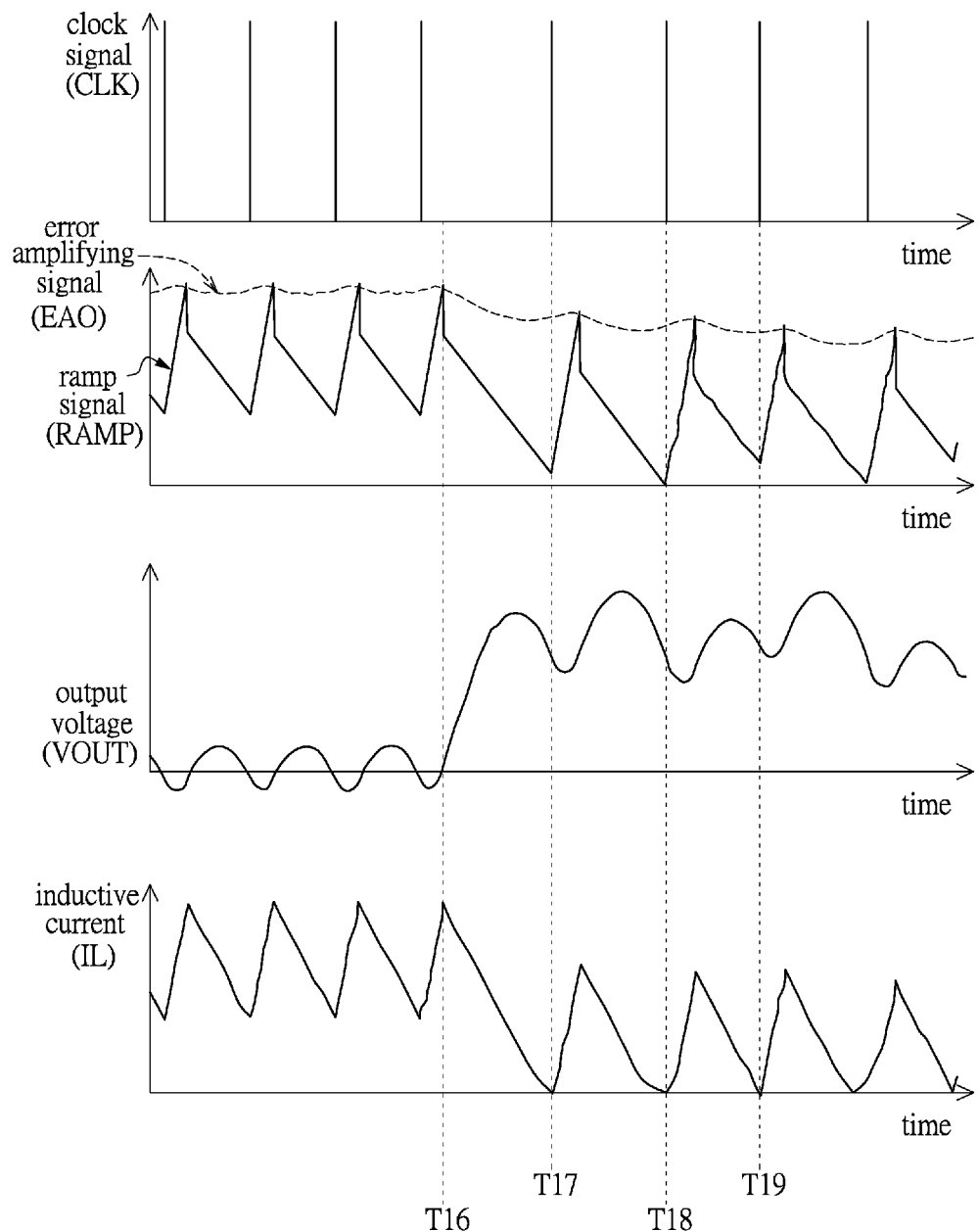
FIG. 6A shows the waveform of the load of the current mode voltage converter according to an embodiment of the present disclosure being converted from heavy load to light load.

In addition, the following description is based on the example that the load is converted from light load to heavy load. As shown in FIG. 6A, the waveform shows the load of the current mode voltage converter according to an embodiment of the present disclosure being converted from heavy load to light load. As shown in FIG. 6A, at time point T16, the load is converted from the heavy load to the light load immediately. At this time, the output voltage VOUT increases, resulting in a decrease in the error amplifying signal EAO. In addition, the AC signal Vac is less than or equal to the DC signal Vdc. Therefore, at time point T17, the clock generator 140 decreases the frequency of the clock signal CLK to lengthen the subsequent time of the clock generator 140 generating the clock signal CLK (e.g., time points T18 and T19), thereby stabilizing the output voltage VOUT to a voltage level gradually.

Figure 6B:
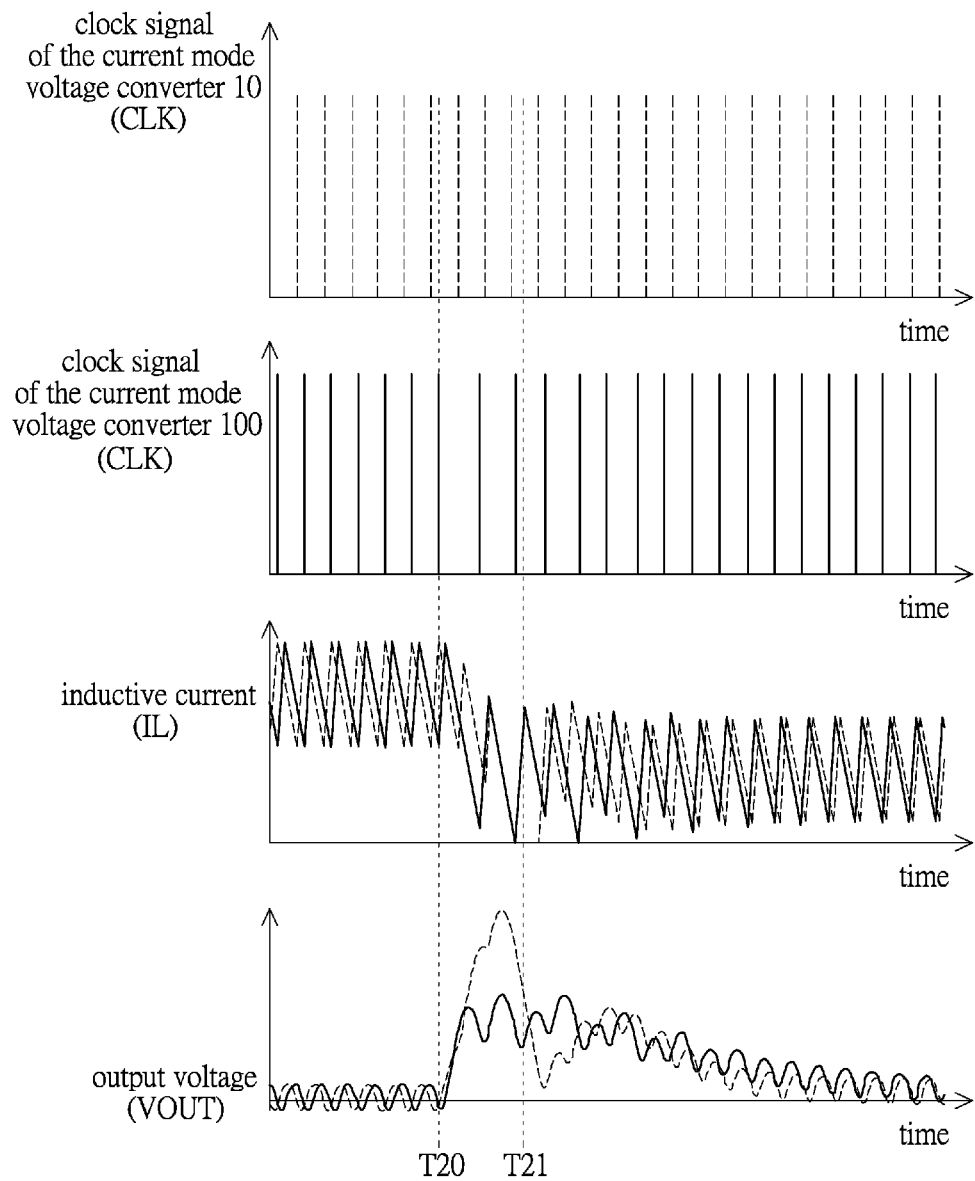
FIG. 6B shows the diagram of comparing the traditional current mode voltage converter with the current mode voltage converter according to FIG. 6A.

The comparison of the traditional current mode voltage converter 10 (the dotted line) and the current mode voltage converter 100 of the present disclosure (the active line) will be described in the following paragraph. As shown in FIG. 6B, at time point T20, the load is converted from the heavy load to the light load immediately. Because the clock signal CLK of the traditional current mode voltage converter 10 is a constant frequency, it would result in the worse transient response of the traditional output voltage VOUT. Therefore, the traditional output voltage VOUT has a larger increase than the output voltage VOUT of the present disclosure (i.e., the time points T20 and T21). Accordingly, in the current mode voltage converter 100 of the present disclosure, when the load is converted from the heavy load to the light load, the transient response of the output voltage VOUT is enhanced.

In summary, the present disclosure provides a current mode voltage converter having fast transient response which adjusts the frequency of a clock signal by using a first compensation circuit and a second compensation circuit to accordingly adjust the inductive current. Therefore, the output voltage can be adjusted rapidly in response to different load changes to enhance the transient response of the output voltage.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A current mode voltage converter having fast transient response, comprising:
    an output-stage circuit, configured for outputting an output voltage according to an inductive current, and configured for generating a feedback voltage according to the output voltage;
    a first compensation circuit, coupled to the output-stage circuit, configured for generating an error amplifying signal according to the feedback voltage and a reference voltage, and comparing an error amplifying signal with a ramp signal indicating the inductive current, to generate a reset signal to the output-stage circuit;
    a second compensation circuit, coupled to the first compensation circuit, configured for receiving the error amplifying signal, and generating an AC signal and a DC signal according to the error amplifying signal, wherein the AC signal is related to an AC value of the error amplifying signal and the DC signal is related to a DC value of the error amplifying signal; and a clock generator, coupled between the second compensation circuit and the output-stage circuit, and generating a clock signal to the output-stage circuit according to the AC signal and the DC signal;

wherein when the AC signal is greater than the DC signal, the clock generator increases a frequency of the clock signal, and the output-stage circuit adjusts the inductive current according to the clock signal and the reset signal;

wherein when the AC signal is less than or equal to the DC signal, the clock generator decreases the frequency of the clock signal, and the output-stage circuit adjusts the inductive current according to the clock signal and the reset signal.

2. The current mode voltage converter having fast transient response according to claim 1, wherein the output-stage circuit comprises:

a switch circuit, having a high-side switch and a low-side switch, wherein an end of the high-side switch receives an input voltage and the other end of the high-side switch connects to a ground by the low-side switch, and a connection end is provided between the high-side switch and the low-side switch;

an inductor, coupled to the connection end, and generating the output voltage according to the inductive current;

a feedback circuit, coupled to the inductor, and generating the feedback voltage according to the output voltage; and a driver, coupled among the clock generator, the first compensation circuit, and the switch circuit, and periodically controlling the high-side switch and the low-side switch according to the clock signal and the reset signal to adjust the inductive current flowing through the high-side switch and the low-side switch.

3. The current mode voltage converter having fast transient response according to claim 2, wherein the driver comprises:

a latch, coupled to the clock generator and the first compensation circuit, and having a set end and a reset end, wherein the set end receives the clock signal, the reset end receives the reset signal, and the latch generates a control signal according to the clock signal and the reset signal; and a switch control circuit, coupled between the latch and the switch circuit, and controlling the turn-on and the turn-off of the high-side switch and the turn-on and the turn-off of the low-side switch according to the control signal;

wherein when the clock signal is converted from the low level to the high level, the latch generates the control signal indicating the turn-on of the high-side switch and the turn-off of the low-side switch;

wherein when the reset signal is converted from the low level to the high level, the latch generates the control signal indicating the turn-off of the high-side switch and the turn-on of the low-side switch.

4. The current mode voltage converter having fast transient response according to claim 3, wherein the first compensation circuit comprises:

a ramp generator, detecting the inductive current and generating the ramp signal indicating the inductive current;

an error amplifier, receiving the feedback voltage and the reference voltage, and generating the error amplifying signal according to the feedback voltage and the reference voltage; and a comparator, coupled to the ramp generator, the error amplifier, and the output-stage circuit, and comparing the ramp signal with the error amplifying signal;

wherein when the ramp signal is greater than the error amplifying signal, the comparator generates the reset signal with the high level;

wherein when the ramp signal is less than or equal to the error amplifying signal, the comparator generates the reset signal with the low level.

5. The current mode voltage converter having fast transient response according to claim 4, wherein the first compensation circuit further comprises a compensating element and the compensating element is coupled to the error amplifier and the comparator.

6. The current mode voltage converter having fast transient response according to claim 4, wherein the second compensation circuit comprises:

a unit gain, having a positive end, a negative end, and an output end, wherein the positive end receives the error amplifying signal, the output is coupled to the negative end, and the unit gain generates the AC signal according to the error amplifying signal; and an RC filter, coupled to the output end and generating the DC signal according to the AC signal.

7. The current mode voltage converter having fast transient response according to claim 6, wherein the clock generator comprises:

a transconductance amplifier, having a first end, a second end, a transconductance output end, wherein the first end and the second end respectively receives the AC signal and the DC signal, and the transconductance amplifier generates a transconductance current according to the AC signal and the DC signal;

a clock capacitor, an end of the clock capacitor coupled to the transconductance output end and a current source, and the other end of the clock capacitor coupled to a ground;

a clock switch, an end of the clock switch coupled to the transconductance output end, and the other end of the clock switch coupled to a ground, wherein the clock switch is periodically turned-on and turned off; and a clock comparator, coupled to the transconductance output end, receiving the transconductance current, and comparing the transconductance current with a threshold voltage to periodically generate the clock signal;

wherein when the AC signal is greater than the DC signal, the clock capacitor receives a sum of the transconductance current and a current generated from the current source to increase a frequency of the transconductance current;

wherein when the AC signal is less than or equal to the DC signal, the clock capacitor receives a difference of the transconductance current and the current generated from the current source to decrease the frequency of the transconductance current.

8. The current mode voltage converter having fast transient response according to claim 1, wherein the first compensation circuit comprises:

a ramp generator, detecting the inductive current and generating the ramp signal indicating the inductive current;

an error amplifier, receiving the feedback voltage and the reference voltage and generating the error amplifying signal according to the feedback voltage and the reference voltage; and a comparator, coupled to the ramp generator, the error amplifier, and the output-stage circuit, and comparing the ramp signal with the error amplifying signal;

wherein when the ramp signal is greater than the error amplifying signal, the comparator generates the reset signal with the high level;

wherein when the ramp signal is less than or equal to the error amplifying signal, the comparator generates the reset signal with the low level.

9. The current mode voltage converter having fast transient response according to claim 8, wherein the first compensation circuit further comprises a compensating element and the compensating element is coupled to the error amplifier and the comparator.

10. The current mode voltage converter having fast transient response according to claim 8, wherein the second compensation circuit comprises:

a unit gain, having a positive end, a negative end, and an output end, wherein the positive end receives the error amplifying signal, the output is coupled to the negative end, and the unit gain generates the AC signal according to the error amplifying signal; and an RC filter, coupled to the output end and generating the DC signal according to the AC signal.

11. The current mode voltage converter having fast transient response according to claim 10, wherein the clock generator comprises:

a transconductance amplifier, having a first end, a second end, a transconductance output end, wherein the first end and the second end respectively receives the AC signal and the DC signal, and the transconductance amplifier generates a transconductance current according to the AC signal and the DC signal;

a clock capacitor, an end of the clock capacitor coupled to the transconductance output end and a current source and the other end of the clock capacitor coupled to a ground;

a clock switch, an end of the clock switch coupled to the transconductance output end and the other end of the clock switch coupled to a ground, wherein the clock switch is periodically turned-on and turned off; and a clock comparator, coupled to the transconductance output end, receiving the transconductance current, and comparing the transconductance current with a threshold voltage to periodically generate the clock signal;

wherein when the AC signal is greater than the DC signal, the clock capacitor receives a sum of the transconductance current and a current generated from the current source to increase a frequency of the transconductance current;

wherein when the AC signal is less than or equal to the DC signal, the clock capacitor receives a difference of the transconductance current and the current generated from the current source to decrease the frequency of the transconductance current.

12. The current mode voltage converter having fast transient response according to claim 1, wherein the second compensation circuit comprises:

a unit gain, having a positive end, a negative end, and an output end, wherein the positive end receives the error amplifying signal, the output is coupled to the negative end, and the unit gain generates the AC signal according to the error amplifying signal; and an RC filter, coupled to the output end and generating the DC signal according to the AC signal.

13. The current mode voltage converter having fast transient response according to claim 12, wherein the RC filter is composed of a plurality of resistors and a plurality of capacitors.

14. The current mode voltage converter having fast transient response according to claim 1, wherein the clock generator comprises:

a transconductance amplifier, having a first end, a second end, a transconductance output end, wherein the first end and the second end respectively receives the AC signal and the DC signal, and the transconductance amplifier generates a transconductance current according to the AC signal and the DC signal;

a clock capacitor, an end of the clock capacitor coupled to the transconductance output end and a current source, and the other end of the clock capacitor coupled to a ground;

a clock switch, an end of the clock switch coupled to the transconductance output end, and the other end of the clock switch coupled to a ground; and a clock comparator, coupled to the transconductance output end, receiving the transconductance current, and comparing the transconductance current with a threshold voltage to periodically generate the clock signal;

wherein when the AC signal is greater than the DC signal, the clock capacitor receives a sum of the transconductance current and a current generated from the current source to increase the frequency of the transconductance current;

wherein when the AC signal is less than or equal to the DC signal, the clock capacitor receives a difference of the transconductance current and the current generated from the current source to decrease the frequency of the transconductance current.

* * * * *